(12) United States Patent
Basson et al.

(10) Patent No.: US 11,255,673 B2
(45) Date of Patent: *Feb. 22, 2022

(54) TECHNOLOGY FOR SHARING GPS NAVIGATION INFORMATION

(71) Applicant: Airbnb, Inc., San Francisco, CA (US)

(72) Inventors: Sara H. Basson, White Plains, NY (US); Peter G. Fairweather, Yorktown Heights, NY (US); Dimitri Kanevsky, Ossining, NY (US); Edward E. Kelley, Wappingers Falls, NY (US)

(73) Assignee: Airbnb, Inc., San Francisco, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/599,516

(22) Filed: Oct. 11, 2019

(65) Prior Publication Data

US 2020/0049506 A1    Feb. 13, 2020

Related U.S. Application Data

(63) Continuation of application No. 15/640,571, filed on Jul. 2, 2017, now Pat. No. 10,495,463, which is a continuation of application No. 12/234,570, filed on Sep. 19, 2008, now Pat. No. 9,726,495.

(51) Int. Cl.
    *G01C 21/00* (2006.01)
    *G01C 21/36* (2006.01)
    *G01C 21/34* (2006.01)

(52) U.S. Cl.
    CPC .......... *G01C 21/00* (2013.01); *G01C 21/34* (2013.01); *G01C 21/3626* (2013.01); *G01C 21/3679* (2013.01)

(58) Field of Classification Search
    USPC ........................................................ 701/400
    See application file for complete search history.

(56) References Cited

U.S. PATENT DOCUMENTS

| 6,020,851 A | 2/2000 | Bussack |
| 6,701,250 B1 | 3/2004 | Rychlak |
| 6,735,523 B1 | 5/2004 | Lin |

(Continued)

OTHER PUBLICATIONS

Priedhorsky et al., "How a Personalized Geowiki Can Help Bicyclists Share Information More Effectively," WikiSym 07, Oct. 21-23, 2007, Montreal, Quebec, Canada.

(Continued)

*Primary Examiner* — Tyler D Paige
(74) *Attorney, Agent, or Firm* — Schwegman Lundberg & Woessner, P.A.

(57) ABSTRACT

GPS devices of vehicles send routes of drivers and automatically generated coordinates of driver positions to a host application for saving on memory remote from the vehicles. Selections of saved routes by drivers and coordinates of driver positions indicating starting and completion of the saved routes are sent to the host application for storing driver trip times corresponding to the saved routes. A driver sends a request for a saved route to the host application. When the host application identifies other saved routes that have start and destination locations within predetermined distances of start and destination locations of the requested saved route, the GPS device of the driver receives at least one of the other save routes from the host application.

17 Claims, 7 Drawing Sheets

(56) References Cited

U.S. PATENT DOCUMENTS

| | | |
|---|---|---|
| 6,748,320 B2 | 6/2004 | Jones |
| 7,072,764 B2 | 7/2006 | Donath |
| 7,188,025 B2 | 3/2007 | Hudson |
| 7,912,630 B2 | 3/2011 | Alewine |
| 8,364,395 B2 | 1/2013 | French |
| 9,080,873 B2* | 7/2015 | Basson ............... G01C 21/34 |
| 9,726,495 B1* | 8/2017 | Basson ............. G01C 21/3626 |
| 10,495,463 B2* | 12/2019 | Basson ............. G01C 21/3679 |
| 2001/0029425 A1 | 10/2001 | Myr |
| 2003/0100316 A1 | 5/2003 | Odamura |
| 2003/0208313 A1 | 11/2003 | Wells |
| 2004/0128071 A1 | 7/2004 | Schradi |
| 2004/0204843 A1 | 10/2004 | Hayama |
| 2005/0102098 A1 | 5/2005 | Montealegre |
| 2006/0015249 A1 | 1/2006 | Gieseke |
| 2006/0200435 A1 | 9/2006 | Finn |
| 2007/0073480 A1* | 3/2007 | Singh ............. G08G 1/096833 701/420 |
| 2007/0150175 A1 | 6/2007 | Shen |
| 2008/0019221 A1 | 1/2008 | Freihofer |
| 2008/0024364 A1 | 1/2008 | Taylor |
| 2008/0040036 A1 | 2/2008 | Peters |
| 2008/0300783 A1 | 12/2008 | Miyajima |
| 2009/0143970 A1 | 6/2009 | Nakano |
| 2009/0157613 A1* | 6/2009 | Strohmenger ......... G06Q 10/10 |
| 2009/0292462 A1* | 11/2009 | Babetski ............... G01C 21/34 701/533 |
| 2011/0238289 A1* | 9/2011 | Lehmann ........... G01C 21/3617 701/533 |
| 2012/0221243 A1* | 8/2012 | Basson ............... G01C 21/00 701/468 |
| 2013/0325333 A1* | 12/2013 | Basson ............... G01C 21/00 701/487 |
| 2016/0364678 A1* | 12/2016 | Cao ....................... G06Q 50/30 |
| 2017/0124671 A1* | 5/2017 | Tam .................... G06Q 20/047 |
| 2017/0255966 A1* | 9/2017 | Khoury .................. H04L 67/20 |
| 2017/0299391 A1* | 10/2017 | Basson ................. G01C 21/34 |
| 2020/0049506 A1* | 2/2020 | Basson ................. G01C 21/34 |
| 2020/0349666 A1* | 11/2020 | Hodge .................. G06F 21/36 |

OTHER PUBLICATIONS

"U.S. Appl. No. 15/640,571, Non Final Office Action dated Mar. 15, 2019", 22 pgs.

"U.S. Appl. No. 15/640,571, Response filed Jun. 17, 2019 to Non Final Office Action dated Mar. 15, 2019", 23 pgs.

"U.S. Appl. No. 15/640,571, Examiner Interview Summary dated Jun. 28, 2019", 3 pgs.

"U.S. Appl. No. 15/640,571, Notice of Allowance dated Jul. 31, 2019", 13 pgs.

"U.S. Appl. No. 12/234,570, Non Final Office Action dated Jun. 7, 2011", 8 pgs.

"U.S. Appl. No. 12/234,570, Response filed Sep. 7, 2011 to Non Final Office Action dated Jun. 7, 2011", 11 pgs.

"U.S. Appl. No. 12/234,570, Supplemental Amendment filed Sep. 9, 2011", 8 pgs.

"U.S. Appl. No. 12/234,570, Examiner Interview Summary dated Sep. 13, 2011", 3 pgs.

"U.S. Appl. No. 12/234,570, Final Office Action dated Oct. 3, 2011", 14 pgs.

"U.S. Appl. No. 12/234,570, Appeal Brief filed Mar. 2, 2012", 33 pgs.

"U.S. Appl. No. 12/234,570, Examiner's Answer dated Mar. 20, 2012", 13 pgs.

"U.S. Appl. No. 12/234,570, Reply Brief filed May 21, 2012", 2 pgs.

"U.S. Appl. No. 12/234,570, Appeal Decision dated Apr. 16, 2015", 7 pgs.

"U.S. Appl. No. 12/234,570, Non Final Office Action dated Jun. 10, 2015", 8 pgs.

"U.S. Appl. No. 12/234,570, Response filed Sep. 10, 2015 to Non Final Office Action dated Jun. 10, 2015", 22 pgs.

"U.S. Appl. No. 12/234,570, Final Office Action dated Oct. 6, 2015", 15 pgs.

"U.S. Appl. No. 12/234,570, Examiner Interview Summary dated Dec. 1, 2015", 3 pgs.

"U.S. Appl. No. 12/234,570, Response filed Dec. 27, 2015 to Final Office Action dated Oct. 6, 2015", 10 pgs.

"U.S. Appl. No. 12/234,570, Non Final Office Action dated Nov. 17, 2016", 15 pgs.

"U.S. Appl. No. 12/234,570, Response filed Jan. 20, 2017 to Non Final Office Action dated Nov. 17, 2016", 12 pgs.

"U.S. Appl. No. 12/234,570, Notice of Allowance dated Mar. 30, 2017", 8 pgs.

"U.S. Appl. No. 13/466,309, Notice of Allowance dated Mar. 11, 2013", 8 pgs.

"U.S. Appl. No. 13/466,309, Notice of Allowance dated Jul. 9, 2013", 7 pgs.

"U.S. Appl. No. 13/960,669, Notice of Allowance dated Mar. 6, 2015", 6 pgs.

"U.S. Appl. No. 13/466,309, Preliminary Amendment filed May 8, 2012", 12 pgs.

"U.S. Appl. No. 13/466,309, Preliminary Amendment filed Feb. 25, 2013", 11 pgs.

"U.S. Appl. No. 13/960,669, Preliminary Amendment filed Oct. 22, 2013", 18 pgs.

"U.S. Appl. No. 13/960,669, Preliminary Amendment filed Aug. 7, 2013", 17 pgs.

"U.S. Appl. No. 13/960,669, Applicant's Summary of Examiner Interview filed Jan. 21, 2014", 2 pgs.

"END920080128US 1_ 12234570_Jan. 2, 2012_Notice_of_Appeal", 32 pgs.

* cited by examiner

TECHNOLOGY FOR SHARING GPS NAVIGATION INFORMATION

BACKGROUND

The present application relates to GPS user devices in vehicles and more particularly to sharing of driver developed or at least driver influenced navigation information among drivers' respective GPS devices.

Global positioning systems (GPS's) are available in more and more vehicles to provide navigation information for drivers. Due to competition for the large market and due to constantly improving technology, development efforts have brought about advances in vehicle navigation GPS's. For example, US Patent Application 20040128071, which is hereby incorporated herein by reference, describes a GPS simulation technique for a driving itinerary which provides a digitized map setting out static environmental features. US Patent Application 20080019221, which is hereby incorporated herein by reference, describes a system for playing audio recordings on a GPS user device. US Patent Application 20080024364, which is hereby incorporated herein by reference, describes a GPS information system capable of downloading audio-visual information associated with GPS coordinates. US Patent Application 20030100316, which is hereby incorporated herein by reference, describes acquiring map information and landmark information using GPS coordinates for a device such as a PDA.

Even with the help of state-of-the-art GPS's, however, it is not uncommon for drivers to get lost and select wrong turns, especially where there are multiple turning options. In many cases, the consequences of these wrong turns are not trivial. Thus, a need still exists for further improvements in the nature of navigation information provided by GPS's to drivers, the way the information is presented, and the way that drivers interact with their GPS's.

SUMMARY

According to an aspect of the present invention, a method for providing navigation information to drivers includes sending routes of the respective drivers from GPS devices of vehicles of the respective drivers to a host application for saving of the received routes on a computer readable memory remote from the vehicles accessible by the host application. Coordinates of the driver positions are sent from the GPS devices of the vehicles of the respective drivers to the host application, the respective coordinates being automatically generated and sent a plurality of times by the respective GPS devices. The method includes sending selections of ones of the saved routes by ones of the drivers and coordinates of driver positions indicating starting and completion of the selected ones of the saved routes to the host application for storing driver trip times corresponding to ones of the saved routes on computer readable memory accessible by the host application. A first one of the drivers sends a request to the host application for one of the saved routes. The GPS device of the first one of the drivers receives from the host application, at least one other one of the saved routes and corresponding trip time responsive to the host application identifying others of the saved routes that have start and destination locations within predetermined distances of start and destination locations of the requested one of the saved routes.

In other embodiments of the invention, other forms are provided, including an apparatus and a computer program product.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION

In the following detailed description of preferred embodiments, reference is made to the accompanying drawings illustrating embodiments in which the invention may be practiced. It should be understood that other embodiments may be utilized, and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Figure 1:
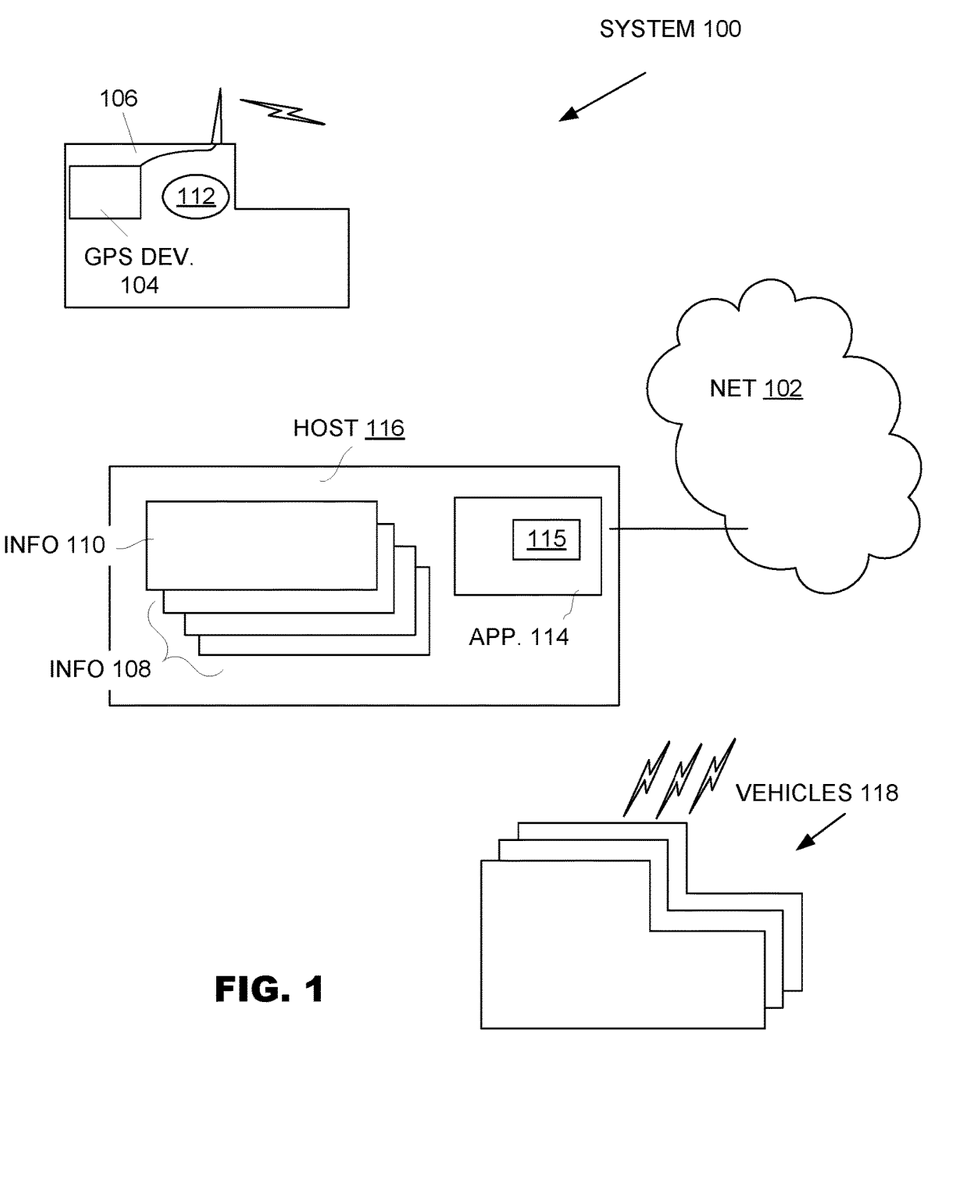
FIG. 1 illustrates a system, according to an embodiment of the present invention.

According to an embodiment of the present invention as shown in FIG. 1, a system 100 provides network 102 communication so that a GPS user device 104 of a first driver's vehicle 106 has access to navigation-related information 108 collected from drivers of other vehicles 118. That is, an enhanced, network-connected GPS device 104 in a vehicle 106 captures on-going human navigation-related information intelligence (information 110) from driver 112, delivers it to an application 114 on a network host 116 for storage and access by drivers of other vehicles 118, and receives from host application 114 such on-going intelligence (information 108) provided by the other drivers. This enhanced navigation information 108 and 110 reduces the likelihood of wrong driver decisions at ambiguous points in the road.

Figure 2:
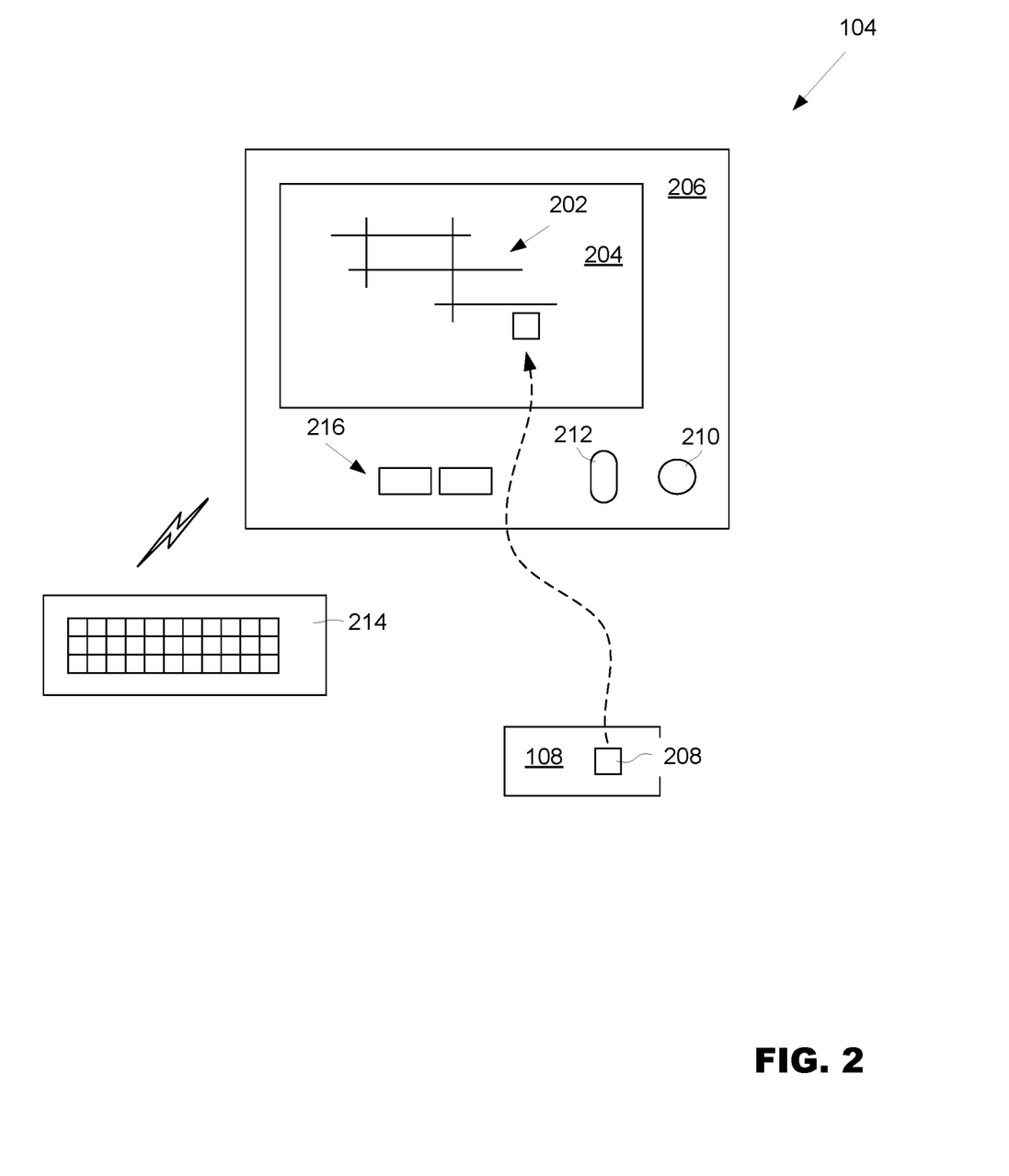
FIG. 2 illustrates GPS user device, according to an embodiment of the present invention.

Referring now to FIG. 2, enhanced, network-connected GPS device 104 presents maps depicting streets 202 on a display 204 of user interface 206. In addition, display 204 also visually depicts landmarks on the correct sides of streets 202. Device 104 gets information about landmarks (such as landmark 208 illustrated in FIG. 2) from information 108 (as shown) or from information 110, for example. GPS device 104 has a speaker 210 that audibly announces landmarks 208, such as "There is a Waymart store coming up on your left." Or, "There is a Waymart store ahead on the left at the intersection of Main Street and Central Avenue, where you will turn right."

Referring now to both FIGS. 1 and 2, the enhanced, network-connected GPS device 104 enables a driver 112 to get enhanced navigation information 108 and 110 by driver interaction during a trip or by planning ahead. During a trip, a driver 112 can receive answers from system 100 responsive to the driver's questions spoken to a microphone 212 of device 104, such as, for example, "What are the landmarks for my current location?" or "What are the landmarks at the next intersection?" Driver 112 can specify criteria for how application 114 selects the answers, as is explained further herein below.

In an embodiment of the present invention, the application on host 116 has aspects of a Wiki-type application, but with new features. That is, the host application 114 enables drivers to create and edit data 108 and 110, including meta-nav information. Application 114 also enables all the drivers to access host data 108 and 110 that was created by other drivers.

Host application 114 is configured to perform processes to facilitate the use by one driver 112 of navigation information 108 created by other drivers. One such process is polling, in which host application 114 determines the most prevalent landmark 208 mentioned in other drivers' annotations in information 108 for a particular location, so that driver 112 may select that annotation for his or her own use. In another process, application 114 enables driver 112 to use trip frequency to select annotations in information 108. That is, if trip or location frequency is a criteria chosen by driver 112 for application 114 to use in selecting an annotation, application 114 automatically selects an annotation from information 108 that was created by another driver who has made a particular trip or passed a particular location the most times. Alternatively, driver 112 may choose a combination of trip or location frequency and polling, according to which host application 114 automatically selects the most prevalent landmark 208 from a group of records (information 108) created by other drivers who have traveled a given route or passed a given location at least some predetermined minimum number of times. Still further, a driver may specify that the host selects a particular person's annotations, i.e., someone known to the user.

Host application 114 permits drivers to use the data 108 and 110 created by other drivers as described above, but in one embodiment of the present invention host application 114 does not permit one driver to replace another driver's annotations, except in the case of annotations designated as transient, as explained herein below. That is, host application 114 permits a second driver to adopt a first driver's annotations as the second driver's own, i.e., copies the first driver's annotations, and then permits the second driver to edit the copy. But application 114 does not permit the second driver to replace or alter the first driver's original annotations on host 116.

Figure 3A:
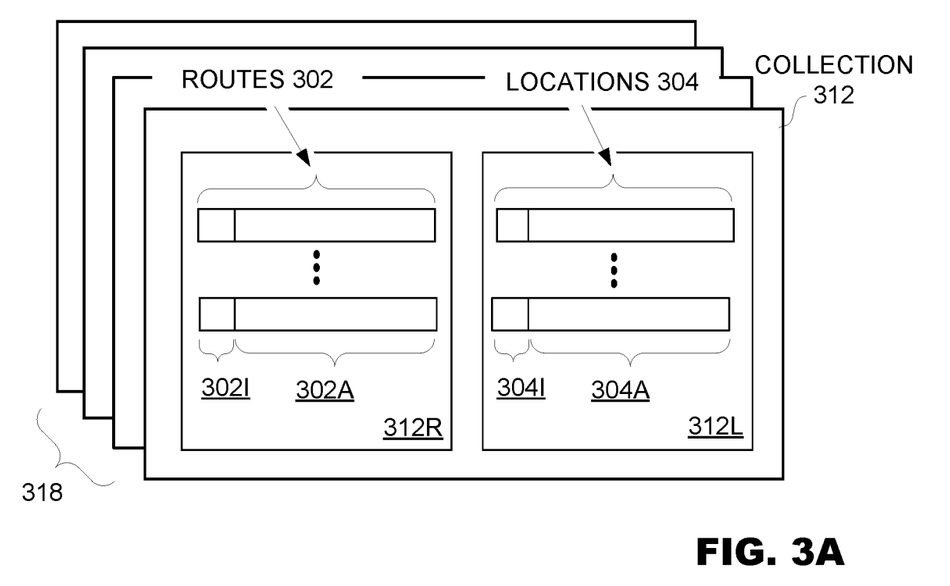
FIG. 3A illustrates collections of annotated navigation information, according to an embodiment of the present invention.

Referring now to FIG. 3A in combination with FIGS. 1 and 2, in planning ahead for a trip, a driver 112 can generate a route 302 or select one from routes 302 already stored on host 116 as information 108 or 110. Driver 112 can also enhance a selected route 302 that is planned by adding landmarks 208 that driver 112 pre-selects from locations 304 already stored as information 108 or 110 on host 116.

During a trip, the networked arrangement also enables a driver 112 to add his or her own information 110 in the form of annotations 302A and 304A. The driver may do the annotating by speaking into a microphone 212 of the GPS device 104. For example, GPS device 104 may record driver 112 saying "Now I am getting ready to turn at the red store." Device 104 then sends this location annotation 304A to host application 114 to store in a collection 312 associated with driver 112. Driver 112 may also later access collection 312 on network host 116 and edit an annotation 302A or 304A. For example, driver 112 may add to an annotation 304A to indicate that the red store is a Penny's department store.

The navigation information 3041 that GPS device 104 sends to host application 114 may include information identifying a location, such as by GPS coordinates, and may include information 302I identifying a route (which may include route name and starting and ending, i.e., destination, locations). Drivers may also send annotation information 304A about a location, including location descriptions, and information 302A about a route, including route descriptions, evaluations and categorizations. Such driver provided information about a location or route is referred to herein as "meta-location information" or "meta-route information," either of which may also be referred to simply as "meta navigation information" or "meta-nav information."

The navigation information that a driver sends for a location and a route is stored by the host as a respective location record 304 or route record 302, which may be in free form text (as will be explained herein below regarding audio to text translation). A location record 304 has a GPS coordinate pair defining a first physical location and has one or more descriptions corresponding to the one or more respective landmark locations (i.e., landmarks that are within a predetermined distance of the first location). Such a description may indicate where the landmark is located in relative or absolute terms. That is, the description may indicate direction of travel and whether the landmark is on the right or left side of a road for the given direction ("relative" terms). Or the description may recite the landmark's location relative to a road in terms of North, South, etc. ("absolute" terms).

Annotations 302A and 304A may include descriptions of tricky routes or portions of routes and descriptions of difficult driving conditions at particular locations. Descriptions of difficult conditions may include traffic conditions and construction obstacles at particular locations. These conditions may be transient or persistent. Descriptions of tricky portions of a route may include identification of key landmarks and relations among landmarks that assist in identifying turns, such as "When you are passing City Hall on Jones Street you will see flashing lights up ahead on the left, which are just before you turn onto Smith Street at the intersection." This provides detail that a conventional static GPS route description does not include. (In the example, "When you are passing City Hall on Jones Street you will see flashing lights up ahead on the left, which are just before you turn onto Smith Street at the intersection," landmarks include City Hall and those particular flashing lights on Jones Street.)

Figure 3B:
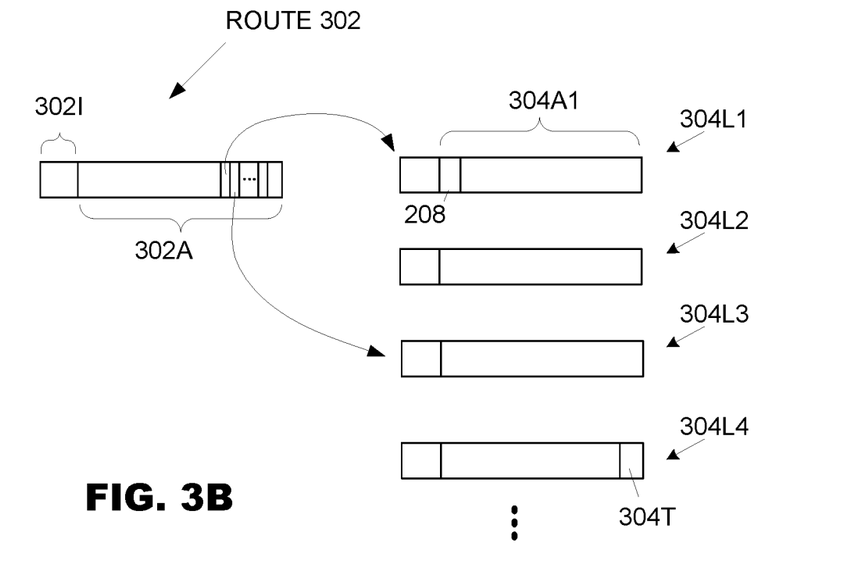
FIG. 3B illustrates route records and location records annotated navigation information in the form of route records and location records, according to an embodiment of the present invention.

Referring now also to FIG. 3B, a route record 302 has start and destination locations and a name within information portion 302I. Route record 302 may also has one or more location pointers (e.g., 302LP1 and 302LP2, as shown in FIG. 3B), which point to one or more respective location records (e.g., location records 304L1 and 304L3 shown the illustrated instance of FIG. 3B) for landmarks associated with the route. (In the illustrated instance, route record 304 does not point to location records 304L2 or 304L4.) Both types of records 302 and 304 also have respective user identifiers that indicate who created them.

Other On-Line Information

In addition to the above described arrangement for providing driver-originated routing and landmarks, an embodiment of the present invention incorporates information of existing on-line product and service directories and directories of telephone numbers for a finer level of navigational detail. These directories include details about store names and businesses at given street addresses. Therefore, navigation information such as "turn left at the Mobil gas station" are made available through the mechanisms and processes of an embodiment of the present invention through communication with these on-line directory databases.

Figure 4:
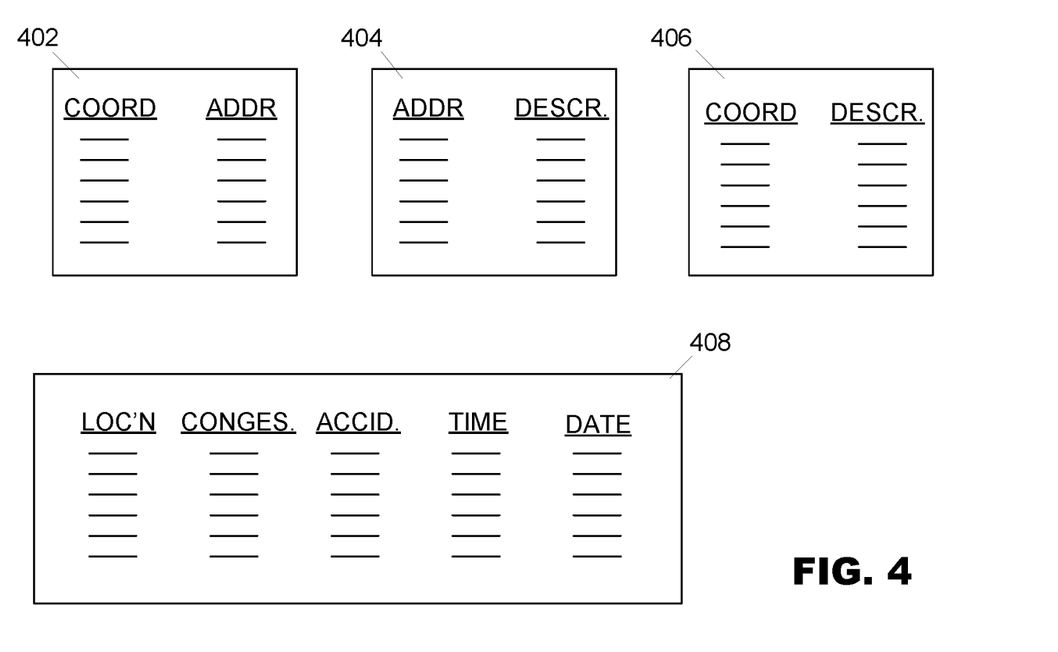
FIG. 4 illustrates various data structures accessed for generating annotated navigation information, according to an embodiment of the present invention.

Referring now to FIG. 4 in combination with FIGS. 1, 2, 3A and 3B, in an illustrated embodiment of the present invention application 114 looks up street addresses that are nearby driver 112 during a trip and then looks up landmarks 208 for those addresses in an on-line database of a directory of advertising services and products (of which the "Yellow Pages" is one example) and presents them to driver 112 for selection. Specifically, host application 114 has access via network 102 to a GPS coordinate/street address cross-reference table 402 and one or more databases 404 that indicate street addresses of residences, government offices, parks, churches, libraries, schools, businesses where specific services and products are sold, etc. Device 104 generates GPS coordinates for the current location of driver 112 and application 114 looks up nearby street addresses that match the GPS coordinates table 402. Using the street addresses returned from those lookup operations, application 114 then identifies landmarks, e.g., residences, government offices, parks, businesses, in the one or more databases 404.

Alternatively, or in addition, application 114 has access to one or more databases 406 that directly identify GPS coordinates for locations, where the locations may include traffic lights, bridges, geographic points of interest, businesses, government offices, residences, etc. Databases 406 such as these that have been compiled by services such as Google or Mapquest may exist already for some areas. Using these databases 406, application 114 may directly look up landmarks responsive to current GPS coordinates.

Application 114 communicates the landmarks found in this manner to GPS device 104 via network 102. GPS device 104 then presents one or more of the identified landmarks 208 to the user (e.g., driver 112), who has an option of selecting from among the presented landmarks. Responsive to the user selecting one of the landmarks 208, application 114 creates a location record 304 (unless one already exists for driver 112 at that location) and adds a description 304A of the landmark for the newly created record 304.

Application 114 also has access to one or more databases 408 with historical traffic information, including accident and traffic congestion histories for particular locations and times of day. Responsive to a request from driver 112 via device 104, application 114 is configured to directly look up these histories in databases 408 for particular locations and use this information to select, rank, or annotate landmarks responsive to current GPS coordinates.

Planning

As previously mentioned, in addition to looking up addresses and associated landmarks that are nearby a driver during a trip, system 100 can pre-build routes with landmarks. That is, system 100 is also capable of generating one or more proposed route records 302 responsive to user entry of start and destination locations. For each turn on a depicted route 302, application 114 or device 104 determines GPS coordinates for the turn and looks up landmarks in one or more of the ways described herein. The user communicates a selection to application 114 indicating whether the user wants the system to i) present a list of the landmarks for each turn for manual selection by the user, or ii) select landmarks for each turn automatically, which may be according to a user specified criteria.

For a pre-built route 302 with landmarks 208, application 114 and device 104 can still look up addresses responsive to coordinates received from device 104 and can thereby present additional associated landmarks during the trip so that user can add to, delete, or replace the pre-selected landmarks on the pre-built route as the user encounters them.

Details Regarding Location-Based Navigation Information Entry

Host application 114 communicates with GPS device 104 in a vehicle 106 of driver 112, which includes application 114 frequently receiving time-stamped, real-time coordinates of the driver's position automatically generated and sent periodically by device 104, where the communication includes identification of device 104. And it may include application 114 receiving a route name along with starting and ending locations of the driver's route, which may also be automatically generated by GPS device 104. Application 114 also receives meta-nav information 302A or 304A from the driver along with the communication of location or route, i.e., meta-nav information 302A and 304A that the driver speaks to or selects from device 104. Consequently, application 114 can automatically associate meta-nav information 302A and 304A received along with the driver's time-stamped location and route identification generated by GPS device 104 at the same time.

Instead of automatic default association, application 114 may alternatively manually associate the meta-nav information 302A and 304A received from driver 112 with the default driver's position and route generated by GPS device 114. This may be done responsive to driver 112 manually entering a command on an input screen 204 or button 216 or keypad 214 of the vehicle's GPS device 104 when driver 112 sends the meta-nav information. That is, for example, the driver may confirm with a button 216 on the GPS user interface 206 that the meta-nav information he or she is sending corresponds to a location that driver 112 is currently at (and route he or she is following) when driver 112 sends meta-nav information 302A and 304A.

This default association between meta-nav information 302A and 304A and location or route identification may be overridden by a different association if the driver manually associates the meta-nav information with a different location or route. That is, when driver 112 sends meta-nav information driver 112 may enter a command indicating that some other location or route corresponds to the meta-nav information 302A or 304A the driver is currently sending. This may include driver 112 pointing to a location shown on a map on GPS user interface 206 to identify the location or entering coordinates by means of a keypad 214 on GPS user interface 206 and may include driver 112 pointing to a route shown on a list on GPS user interface 206 or entering a route name via keypad 214.

Audio Data Entry

As previously indicated, host application 114 may receive navigation information 110 sent by the driver 112 in an audio format. This may include receiving coordinates, location name, route name and meta-information, or any one or more of them, that driver 112 has generated by speaking into microphone 212 of interface 206.

If the navigation information 110 is entered via microphone 212, the information is sent to host application 114 via network 102 using a protocol that identifies the information 110 to application 114 as being associated with the driver's GPS device 104 and the GPS-device-provided, time-stamped location coordinates, location name and route name and driver-provided meta-nav information 302A and 304A. However, if driver 112 phones in navigation information to application 114, driver 112 also identifies his or her GPS device 104 to host application 114, such as by means of a unique identifier for device 104. (In its communication to host application 114, GPS 104 also automatically and independently communicates this identifier.) Thus, when driver 112 phones in the identifier and meta-nav information 302A or 304A, application 114 may responsively associate it to the driver's location and route that are provided to application 114 by the device 104 at the same time.

Since, as described above, meta-nav information may be received by host application 114 and stored as audio of the real voices of drivers that call in the information, the application 114 can also store and then deliver it to the GPS devices 104 of other drivers for the devices 104 to present as audio rendered as real voices of drivers. Alternatively, device 104 or application 114 can convert the meta-nav information to text and deliver it to the GPS devices 104 of other drivers. A GPS device 104 of a driver then presents the information to the driver in this format or converts the text to a computer-generated voice and presents the information in the voice of GPS device 104. Alternatively, application 114 can send the audio to a driver's GPS device 114, which then converts the audio to text and presents it as text to the driver or as a GPS computer-generated voice.

Transient Information

In another enhancement provided according to an embodiment of the present invention, if a driver indicates an annotation 302A or 304A that he or she provides concerns transient information, application 114 automatically deletes it from storage after a predetermined time interval.

The time interval may be specified by the driver who provides the annotation 302A or 304A or by another driver, or it may be a default time interval that depends on the nature of the transient information. For example, if annotation 302A or 304A concerns a traffic jam that the provider indicates is due to a car wreck, application 114 may automatically apply a relatively short default time interval such as three or four hours, for example. If the driver indicates that annotation 302A or 304A concerns minor construction, application 114 automatically applies a relatively longer default time interval such as three or four days, for example. If the driver indicates that annotation 302A or 304A concerns major construction, application 114 automatically applies a still longer default time interval such as three or four weeks, for example. Such a default time interval may be overridden by the creator, who does so by initially supplying a time interval when creating annotation 302A or 304A or may be overridden later by other drivers communicating new time intervals for annotation 302A or 304A to application 114. Application 114 includes the expiration time in annotation 302A or 304A. Overriding by another driver will typically happen when the other driver sees that annotation 302A or 304A is about to expire and observes that the condition described therein will persist for some time after the current expiration time.

New Types of Alternative Routes

Because drivers and their GPS devices 104 cooperate with host application 114 to produce route and location annotations 302A and 304A, the arrangement described herein enables application 114 and devices 104 to provide drivers new kinds of routes responsive to new criteria that the drivers specify, such as "fewest accidents reported historically," "fewest accidents reported recently," "least amount of current road construction," "least amount of current traffic congestion," "least businesses," "most coffee shops," "least traffic lights," "least traveled roads," etc. While certain traffic congestion or construction information may be available via some centralized data source in large cities, this information is not currently available at the level of detail and for cities as small as enabled by the arrangement described herein, wherein human navigation-related intelligence is collected from and shared immediately among many drivers on an on-going basis.

Also, because application 114 has access to collections of routes, the arrangement described herein enables drivers to specify to application 114 that the application must build a route using specifically selected sub-routes, such as routes the driver has collected. These may be shortcut routes or routes that go by particular locations that serve some purposes for the driver, such as a grocery store and dry cleaner for example.

Figure 3C:
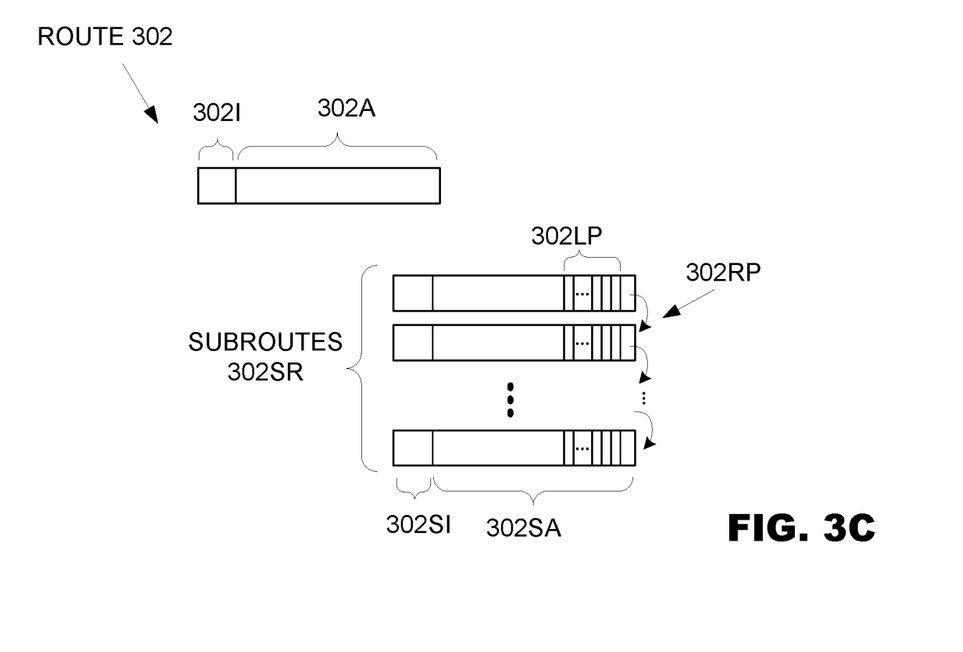
FIG. 3C illustrates another form of a route record, according to an embodiment of the present invention.

Referring now to FIG. 3C, details are shown for a route record 302 that has sub-routes 302SR, according to an embodiment of the present invention. Route 302 has a primary sub-record that includes an identifier portion 302I and an annotation portion 302A and has sub-route records 302SR that include an identifier portions 302SI and annotation portions 302SA. All of sub-route records 302SR except the last one each include a pointer 302RP pointing to the next sub-route record 302SR in the route. Sub-route records 302SR each may also include location pointers 302LP, which function and are structured in the manner described for routes in FIG. 3B. Alternatively, route 302 may have a single route record and may merely include pointers 302RP and 302LP in the route record annotation 302A, where pointers 302RP point to other route records, which may originate from the same driver's collection 312 or may originate from other drivers' collections 318.

Alternate Routes with a Finer Level of Granularity

GPS devices currently work through an algorithm that computes a path with certain characteristics between a current point and some target. According to the present invention, this global algorithm is recast as a planning heuristic within which local choices are offered to the driver. In other words, the conventional heuristic operates at the level of the overall plan, whereas an embodiment of the present invention provides another algorithm/heuristic that explores different possibilities within that overall plan. Thus, improved system 100 provides options at specific decision points within an overall trip. For example, a process of application 114 according to the present invention presents options permitting the driver to select different sub-routes within a given route, such as "Get off at Millwood in 0.1 mile for the most direct way OR get off at Highway 134 in 5 miles for the shortest."

Transferring Data

The driver's personalized choices can be available on a memory stick, and therefore transportable to other vehicles.

Learning Algorithms

In an embodiment of the present invention, system 100 learns by monitoring drivers who created stored information 108 and 110. In one such feature, for all drivers who have location records 304 or route records 302, application 114 receives GPS coordinates on an on-going basis and compares driver locations (as indicated by the received coordinates) to the drivers' respective location records 304. If a driver drives by one of these locations, application 114 increments a count 304T that is included in annotation 304A for that driver's record 304. Thus, the accumulated value of count 304T indicates the number of times the driver has passed by the location represented by location record 304. Application 114 may use this count 304T to automatically select landmarks, as described herein.

In another learning feature, responsive to a driver selecting a route represented by a particular route record 302 for a trip and passing the starting location for that route, application 114 starts a timer 115 for that trip and that driver. Once the driver passes the destination location for that route, application 114 detects this from the received coordinates sent by GPS device 104, stops timer 115, and records the accumulated time for the trip in route annotation 302A of route record 302 for that route and that driver. Using this information, application 114 also computes statistics and stores them in route annotation 302A, including average trip time and minimum and maximum trip times for that route and driver. (Application 114 may also record starting and ending times for the trip so that the statistics can include time of day for the trip.) In this manner, application 114 accumulates trip times and statistics for many drivers and many routes.

Responsive to a query by a driver for a particular route, application 114 also automatically identifies other route records 304 of the same and other drivers that have start and destination locations within predetermined distances of the start and destination locations of the particular route and presents the routes and their trip times and statistics to the querying driver, or else automatically selects one or more routes to present to the querying driver, depending upon details of the query. For example, if a driver query is for an unfiltered list, application 114 responsively identifies and presents all routes that match the particular route identified in the query. For example, if a driver query is for matching routes with the three fastest trip times, application 114 responsively selects the three routes with fastest trip times or fastest average trip times (depending on what the query specifies) that match the particular route identified in the query. The driver may further limit the query to matching routes where trips were during a predetermined range of time of day, so that the application 114 responsively selects routes matching the particular route identified in the query and that have the three fastest associated trip times during the predetermined time of day. The driver may further limit the query to matching routes depending upon how these routes were categorized by the drivers who created them. Drivers may annotate routes to include categories such as fastest, most scenic, shortest, best during heavy traffic, etc.

Figure 5:
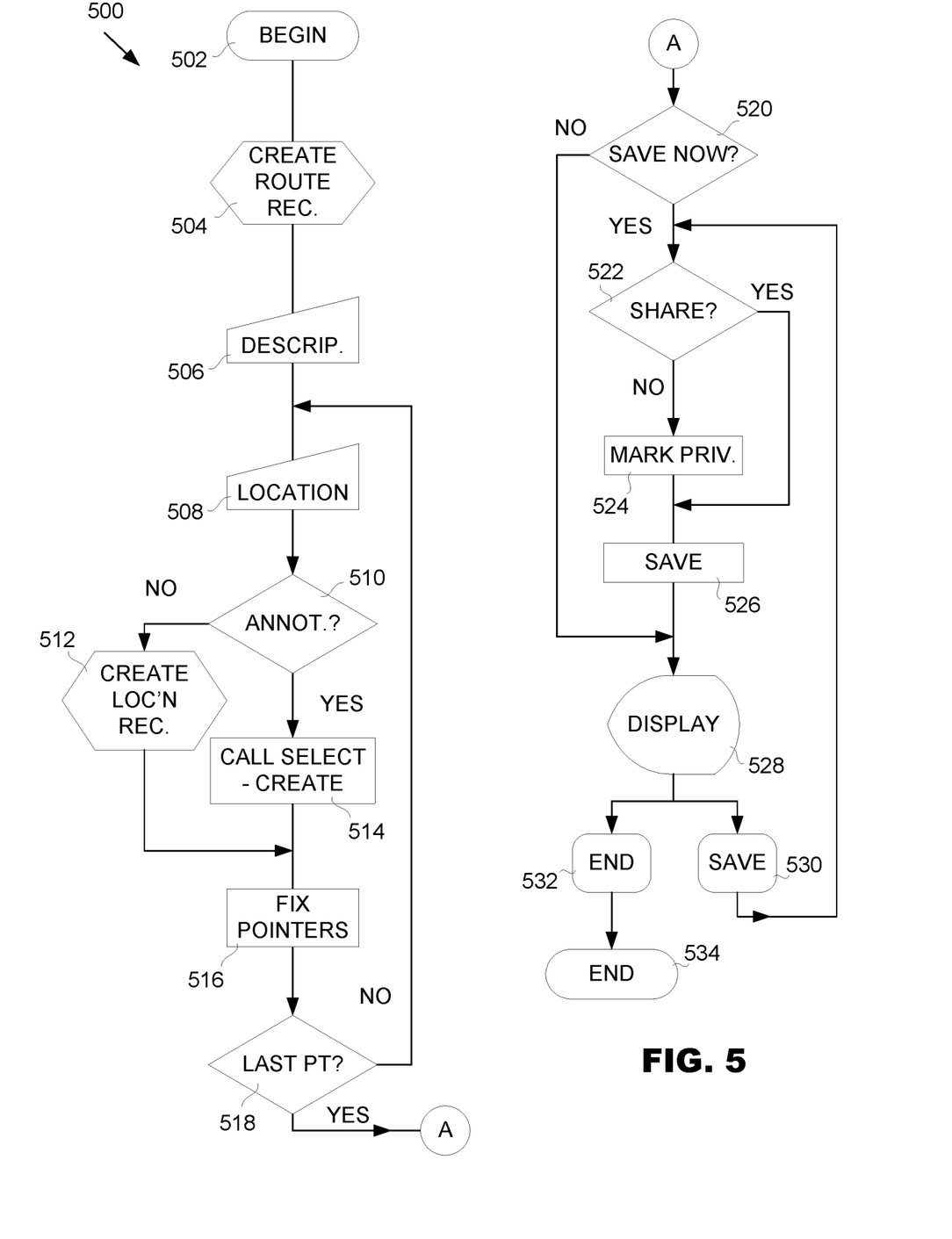
FIG. 5 illustrates a process for creating annotated navigation information for a route, according to an embodiment of the present invention.

Referring now to FIG. 5 in connection with FIGS. 1, 2 and 3A, a process 500 is illustrated for creating annotated navigation information for a route, according to an embodiment of the present invention. Process 500 receives input (via GPS device 104) from a driver. Upon beginning at 502, process 500 creates at 504 a route record 302 for annotating by the driver. It should be understood that process 500 may include sub-processes that run on GPS devices 104 of respective drivers and on host application 114 respectively. For example, process 504 may include GPS device 104 creating record 304 and sending it to application 114 to store on host 116.

Next, at 506, process 500 receives a description of the route from the driver, which may include a route name and a category for the route, among other things. Subprocess 506 associates the description with the route record 304.

Next, at 508, process 500 receives identification of a starting location for the route from the driver. As part of subprocess 508, GPS device 104 may determine coordinates for a location that the driver points to on the displayed map via a touch-screen display 204. Next, subprocess 510 receives an indication from the driver of whether the driver wants to annotate the location that was just identified. If not, GPS device 104 creates a location record 304 that includes the coordinates for the location and communicates this to application 114, Alternatively, application 114 may create and store the location record 304 based on the coordinates from device 104.

Figure 6:
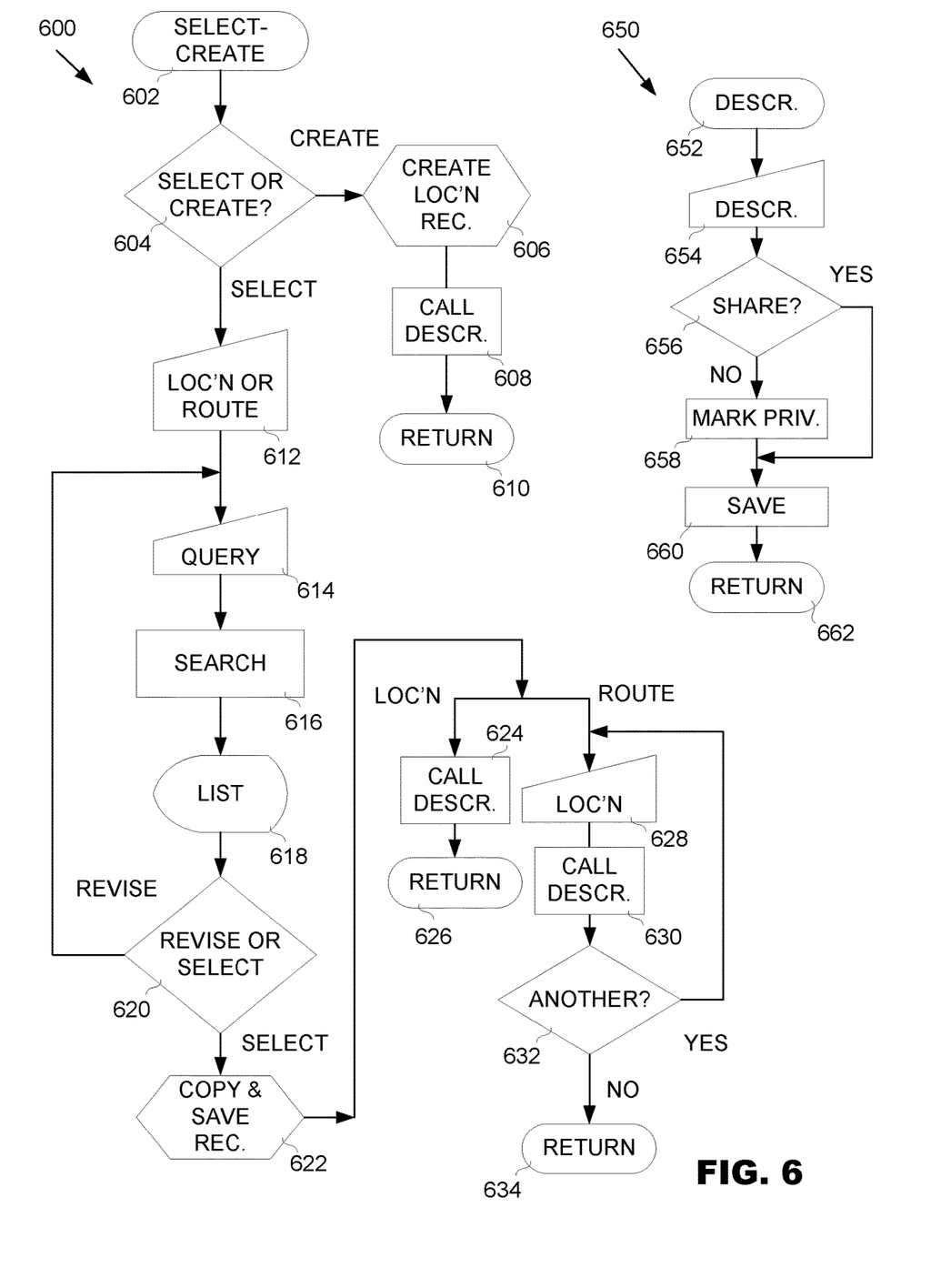
FIG. 6 illustrates a process for creating annotated navigation information for a location and for finding, selecting and revising existing annotated navigation information for a location and a route, according to an embodiment of the present invention.

If the driver indicates at 510 that he or she wants to create his or her own annotated location record for the current location, or else select an existing annotated location record or route record for the current location, then subprocess 514 calls a select-create subroutine (shown as process 600 on FIG. 6, according to an embodiment of the invention). Once the location or subroute (which may also be the entire route if, for example, the driver has selected to adopt an existing route via the select-create subroutine called by subprocess 514) is created or selected and annotated, the subroutine returns and at subprocess 516 one or more pointers are fixed. (In the case of a first location, a pointer is fixed at 516 in route record 302 to point to first location record 302. In the case of a second location, a pointer is fixed to point from the first location's record 302 to the second location's record, etc.)

Next, subprocess 518 receives input from the driver indicating whether the current location is the last one. If not, then subprocess 518 branches back to subprocess 508 to receive a next location identification, etc. If subprocess 518 receives an indication that the current location is the last one in the route, then subprocess 518 branches to subprocess 520, which prompts the driver to indicate whether to save the current route.

If yes, then subprocess 522 prompts the driver to indicate for the current route, which is about to be saved, whether to make it accessible to with other drivers. If no, then subprocess 524 marks the route record private and subprocess 526 saves it. If yes, then subprocess 524 does not mark the location or subroute record private, thereby enabling others to access it, and subprocess 526 saves it.

Next, subprocess 528 displays the route on display 204 and presents the driver with the option of ending at 532 (in case the driver did not already elect to save) or else saving the route at 530. If the driver chooses to end, process 500 ends at 534.

Referring now to FIG. 6, a process 600 is illustrated for creating annotated navigation information for a location and for finding, selecting and revising existing annotated navigation information for a location and a route, according to an embodiment of the present invention. Also, a process 650 is illustrated in FIG. 6, according to an embodiment of the present invention, for receiving and saving annotations from a user, e.g., driver, in association with location and route navigation information. In the illustrated embodiment, process 600 is a subroutine that may be called by process 500 of FIG. 5 and process 650 is a subroutine that may be called by process 600. However, processes 600 and 650 may alternatively be stand-alone processes that may be invoked directly, as will be understood by a person of ordinary skill in the computer programming arts.

Process 600 begins at 602 and proceeds to present at 604 a choice to the driver whether to create an annotated location record from scratch, or whether to select an existing annotate location or route record. If the driver selects to create an annotated location record 304 from scratch, then subprocess 606 creates the initial record and then subprocess 608 calls a subroutine 650 that receives information from the driver for annotating record 304. Once subroutine 650 completes and saves record 304, it returns to process 600, which returns at 610 to its calling process 500. (In an embodiment in which process 600 is not a subroutine, process 600 ends at 610.)

If the driver elects at 604 to select an existing annotate location or route record, subprocess 612 prompts and receives from the driver an indication whether he or she wants to select a location or a route. Then subprocess 614 prompts and receives a query from the driver, which defines criteria for application 114 or device 104 to use in searching for an existing route (if the driver indicate route at 612) or location (if the driver indicated location at 612). Responsive to the query, subprocess 616 searches existing routes or locations and subprocess 618 lists matching results on display 204 or audibly via speaker 210.

Subprocess 620 prompts and receives an indication whether the driver wishes to select one of the listed results or wishes to revise the criteria. If revise, then subprocess 620 branches back to the receive query subprocess 614. If the driver instead selects one of the listed results, then subprocess 622 copies the record to adopt it as the driver's own and saves it.

Then subprocess 622 branches to either subprocess 624 (if the query and selected result were for a location record) or subprocess 628 (if the query and selected result were for a route record). If the adopted result is a location, then subprocess 624 calls subroutine 650, which receives information from the driver for the driver's own annotating of the driver's copy of the selected record 304. Once subroutine 650 completes and saves annotations to driver's record 304, it returns to process 600, which returns at 626 to its calling process 500 (or terminates).

If the selected result is a route, then subprocess 628 prompts and receives identification of a location on the route from the driver. Then subprocess 630 calls subroutine 650, which receives information from the driver for the driver's own annotating of the adopted location record 302 on the adopted route record 304. Once subroutine 650 completes and saves annotations to driver's adopted record 302, it continues to subprocess 632, which prompts and receives an indication from the driver as whether the driver wants to select another location on the route. Once the driver has finished annotating all the locations, process 600 returns at 634 to its calling process 500 (or terminates).

Subroutine 650 begins at 652 and continues to prompt and receive at 654 a description from the driver for annotating navigation information, e.g., a location record. Then subprocess 654 prompts and receives an indication from the driver whether he or she wants to make the annotated record accessible to other drivers. If not, then process 658 marks the record private and then subprocess 660 saves the record. If yes, then subprocess 660 saves the record without subprocess 658 marking it private. Then subroutine 650 returns to the calling program (or terminates).

It should be understood that GPS device 104 may call subroutine 600 during a trip responsive to a process of GPS 104 receiving an indication that the driver wants to annotate a current location or find an existing location annotation, in which case GPS device 104 automatically passes coordinates of the current location to subroutine 600 for its use in creating an annotated location record at 606 or finding one at 616.

Figure 7:
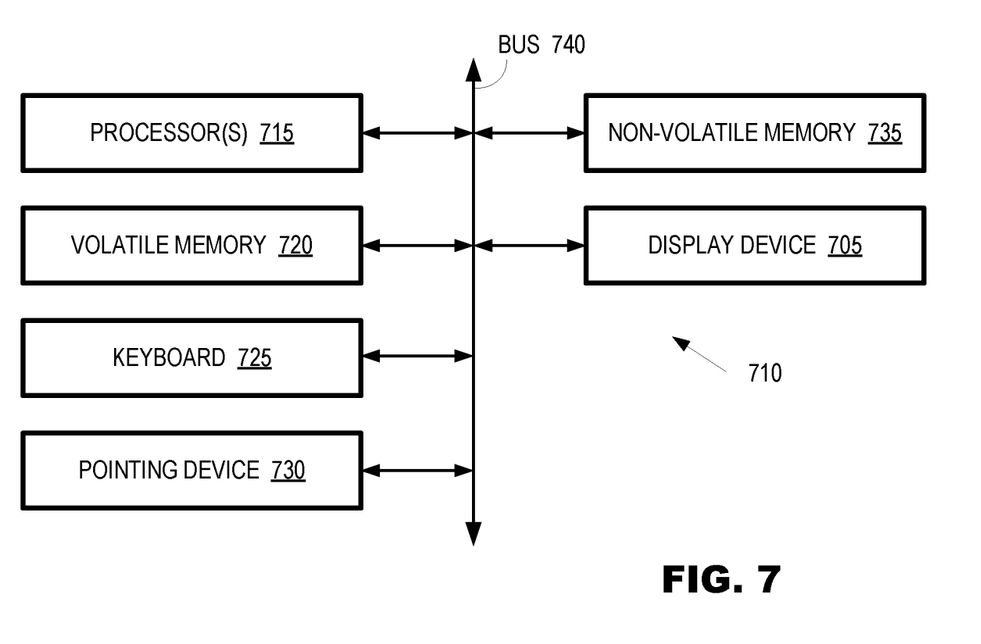
FIG. 7 illustrates a computer system that is generally applicable for embodiments of a host computer system and of a GPS user device described herein, according to an embodiment of the present invention.

Referring now to FIG. 7, a computer system 710 is shown that is generally applicable for embodiments of host computer system 116 and GPS user device 104 described herein. Computer system 710 includes one or more processors 715, a volatile memory 720, e.g., RAM, a keyboard 725, a pointing device 730, e.g., a mouse, a nonvolatile memory 735, e.g., ROM, hard disk, floppy disk, CD-ROM, and DVD, and a display device 705 having a display screen. Memory 720 and 735 are for storing program instructions, which are executable by processor 715 to implement various embodiments of a method in accordance with the present invention. Components included in system 710 are interconnected by bus 740. A communications device (not shown) may also be connected to bus 740 to enable information exchange between system 710 and other data carriers.

In various embodiments computer system 710 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium.

The memory medium preferably stores instructions (also known as a "software program") for implementing various embodiments of a method in accordance with the present invention. In various embodiments, the one or more software programs are implemented in various ways, including procedure-based techniques, component-based techniques, and/or object-oriented techniques, among others. Specific examples include XML, C, C++, Java and Microsoft Foundation Classes (MFC).

While the present invention has been described in the context of a software application and a computer system, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, and CD-ROMs.

Those of ordinary skill in the art will appreciate that the hardware depicted herein may vary depending on the implementation. The depicted example is not meant to imply architectural limitations with respect to the present invention.

The terms "logic" and "memory" and the like are used herein. It should be understood that these terms refer to circuitry that may be part of the design for an integrated circuit chip. Such a chip design is created in a graphical computer programming language and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The description of embodiments of the invention has been presented for purposes of illustration but is not intended to be exhaustive or to limit the invention to the form disclosed. Many modifications and variations will be apparent to those of ordinary skill in the art. For example, it should be understood that herein above various functions of host application 114 have been described along with related data structures that may be stored on the host, but that some of these functions may be performed by device 104 instead of application 114. For example, it has been described above that a driver 112 can speak to a microphone 212 of device 104 to request a landmark, wherein the driver specifies criteria for how application 114 selects the landmark. It should be understood that application 114 may provide to device 104 collections of annotated landmarks for an entire route or for a particular location or set of locations within some predetermined proximity of a requested location, and that device 104 may then select a particular landmark responsive to the driver specified criteria.

To reiterate, the embodiments were chosen and described in order to best explain the principles of the invention, the practical application, and to enable others of ordinary skill in the art to understand the invention. Various other embodiments having various modifications may be suited to a particular use contemplated but may be within the scope of the present invention.

Unless clearly and explicitly stated, the claims that follow are not intended to imply any particular sequence of actions. If labels, such as a), b), c) etc., are included for portions of the claims, this does not, by itself, imply any particular sequence, but rather is merely to facilitate reference to the portions.

What is claimed is:

1. A method for providing navigation information to drivers, the method comprising:
   sending routes of the respective drivers from GPS devices of vehicles of the respective drivers to a host application for saving of the received routes on a computer readable memory remote from the vehicles accessible by the host application;
   sending coordinates of the driver positions from the GPS devices of the vehicles of the respective drivers to the host application, the respective coordinates being automatically generated and sent a plurality of times by the respective GPS devices;
   sending selections of ones of the saved routes by ones of the drivers and coordinates of driver positions indicating starting and completion of the selected ones of the saved routes to the host application for storing driver trip times corresponding to ones of the saved routes on computer readable memory accessible by the host application;
   sending a request to the host application from a first one of the drivers for one of the saved routes, wherein the sending of the request to the host application from the first one of the drivers for one of the routes includes sending an indication of what others of the routes the first one of the drivers requests; and
   receiving, by the GPS device of the first one of the drivers from the host application, at least one other one of the saved routes and corresponding trip time responsive to the host application identifying others of the saved routes that have start and destination locations within predetermined distances of start and destination locations of the requested one of the saved routes.

2. The method of claim 1, wherein the sending of the request to the host application from the first one of the drivers for one of the routes includes:
   sending an indication that the first one of the drivers requests others of the routes that have start and destination locations within predetermined distances of start and destination locations of the requested one of the routes;
   and wherein the method includes:
   sending to the GPS device of the first one of the drivers, by the host application responsive to the request, others of the saved routes that have start and destination locations within predetermined distances of start and destination locations of the requested one of the saved routes.

3. The method of claim 1, wherein the sending of the request to the host application from the first one of the drivers for one of the saved routes includes sending an indication that the first one of the drivers requests others of the saved routes that have fastest trip times and that have start and destination locations within predetermined distances of start and destination locations of the requested one of the saved routes;
   and wherein the method includes:
   receiving by the GPS device of the first one of the drivers others of the saved routes that have the fastest trip times and that have start and destination locations within predetermined distances of start and destination locations of the requested one of the saved routes.

4. The method of claim 1, wherein the sending of the request to the host application from the first one of the drivers for one of the saved routes includes sending an indication that the first one of the drivers requests others of the saved routes that have fastest average trip times and that have start and destination locations within predetermined distances of start and destination locations of the requested one of the saved routes;
   and wherein the method includes:
   receiving by the GPS device of the first one of the drivers others of the saved routes that have the fastest average trip times and that have start and destination locations within predetermined distances of start and destination locations of the requested one of the saved routes.

5. The method of claim 1, wherein the sending of the request to the host application from the first one of the drivers for one of the saved routes includes sending an indicated range of time of day and an indication that the first one of the drivers requests others of the saved routes that have start and destination locations within predetermined distances of start and destination locations of the requested one of the saved routes and that were during the indicated range of time of day; and
- wherein the method includes receiving by GPS device of the first one of the drivers saved routes that have start and destination locations within predetermined distances of start and destination locations of the requested one of the saved routes and that were during the indicated range of time of day.

6. The method of claim 1, wherein the sending of the request to the host application from the first one of the drivers for one of the saved routes includes sending an indicated category of saved routes and an indication that the first one of the drivers requests others of the saved routes that have start and destination locations within predetermined distances of start and destination locations of the requested one of the saved routes and that were of the indicated category;
- and wherein the method includes receiving by the GPS device of the first one of the drivers saved routes that have start and destination locations within predetermined distances of start and destination locations of the requested one of the saved routes and that were categorized in the indicated category by the drivers who created them.

7. A non-transitory computer-readable medium storing instructions that, when executed by one or more computing devices, cause the one or more computing device to perform operations for providing navigation information to drivers, the operations comprising:
- sending routes of the respective drivers from GPS devices of vehicles of the respective drivers to a host application for saving of the received routes on a computer readable memory remote from the vehicles accessible by the host application;
- sending coordinates of the driver positions from the GPS devices of the vehicles of the respective drivers to the host application, the respective coordinates being automatically generated and sent a plurality of times by the respective GPS devices;
- sending selections of ones of the saved routes by ones of the drivers and coordinates of driver positions indicating starting and completion of the selected ones of the saved routes to the host application for storing driver trip times corresponding to ones of the saved routes on computer readable memory accessible by the host application;
- sending a request to the host application from a first one of the drivers for one of the saved routes, wherein the sending of the request to the host application from the first one of the drivers for one of the routes includes sending an indication of what others of the routes the first one of the drivers requests; and
- receiving, by the GPS device of the first one of the drivers from the host application, at least one other one of the saved routes and corresponding trip time responsive to the host application identifying others of the saved routes that have start and destination locations within predetermined distances of start and destination locations of the requested one of the saved routes.

8. The non-transitory computer-readable medium of claim 7, wherein the sending of the request to the host application from the first one of the drivers for one of the routes includes:
- sending an indication that the first one of the drivers requests others of the routes that have start and destination locations within predetermined distances of start and destination locations of the requested one of the routes;
- and wherein the operations further comprise:
- sending to the GPS device of the first one of the drivers, by the host application responsive to the request, others of the saved routes that have start and destination locations within predetermined distances of start and destination locations of the requested one of the saved routes.

9. The non-transitory computer-readable medium of claim 7, wherein the sending of the request to the host application from the first one of the drivers for one of the saved routes includes sending an indication that the first one of the drivers requests others of the saved routes that have fastest trip times and that have start and destination locations within predetermined distances of start and destination locations of the requested one of the saved routes;
- and wherein the operations further comprise:
- receiving, by the GPS device of the first one of the drivers, others of the saved routes that have the fastest trip times and that have start and destination locations within predetermined distances of start and destination locations of the requested one of the saved routes.

10. The non-transitory computer-readable medium of claim 7, wherein the sending of the request to the host application from the first one of the drivers for one of the saved routes includes sending an indication that the first one of the drivers requests others of the saved routes that have fastest average trip times and that have start and destination locations within predetermined distances of start and destination locations of the requested one of the saved routes;
- and wherein the operations further comprise:
- receiving, by the GPS device of the first one of the drivers, others of the saved routes that have the fastest average trip times and that have start and destination locations within predetermined distances of start and destination locations of the requested one of the saved routes.

11. The non-transitory computer-readable medium of claim 7, wherein the sending of the request to the host application from the first one of the drivers for one of the saved routes includes sending an indicated range of time of day and an indication that the first one of the drivers requests others of the saved routes that have start and destination locations within predetermined distances of start and destination locations of the requested one of the saved routes and that were during the indicated range of time of day;
- and wherein the operations further comprise receiving, by GPS device of the first one of the drivers, saved routes that have start and destination locations within predetermined distances of start and destination locations of the requested one of the saved routes and that were during the indicated range of time of day.

12. The non-transitory computer-readable medium of claim 7, wherein the sending of the request to the host application from the first one of the drivers for one of the saved routes includes sending an indicated category of saved routes and an indication that the first one of the drivers requests others of the saved routes that have start and destination locations within predetermined distances of start and destination locations of the requested one of the saved routes and that were of the indicated category;

and wherein the operations further comprise receiving, by the GPS device of the first one of the drivers, saved routes that have start and destination locations within predetermined distances of start and destination locations of the requested one of the saved routes and that were categorized in the indicated category by the drivers who created them.

13. An apparatus for providing navigation information to drivers comprising:

a processor; and a storage device connected to the processor, wherein the storage device has stored thereon a navigation information program for controlling the processor, and wherein the processor is operative with the program to execute the program for performing:

sending routes of the respective drivers from GPS devices of vehicles of the respective drivers to a host application for saving of the received routes on a computer readable memory remote from the vehicles accessible by the host application;

sending coordinates of the driver positions from the GPS devices of the vehicles of the respective drivers to the host application, the respective coordinates being automatically generated and sent a plurality of times by the respective GPS devices;

sending selections of ones of the saved routes by ones of the drivers and coordinates of driver positions indicating starting and completion of the selected ones of the saved routes to the host application for storing driver trip times corresponding to ones of the saved routes on computer readable memory accessible by the host application;

sending a request to the host application from a first one of the drivers for one of the saved routes, wherein the sending of the request to the host application from the first one of the drivers for one of the routes includes sending an indication of what others of the routes the first one of the drivers requests; and receiving, by the GPS device of the first one of the drivers from the host application, at least one other one of the saved routes and corresponding trip time responsive to the host application identifying others of the saved routes that have start and destination locations within predetermined distances of start and destination locations of the requested one of the saved routes.

14. The apparatus of claim 13, wherein the sending of the request to the host application from the first one of the drivers for one of the routes includes:

sending an indication that the first one of the drivers requests others of the routes that have start and destination locations within predetermined distances of start and destination locations of the requested one of the routes;

and wherein the method includes:

sending to the GPS device of the first one of the drivers, by the host application responsive to the request, others of the saved routes that have start and destination locations within predetermined distances of start and destination locations of the requested one of the saved routes.

15. The apparatus of claim 13, wherein the sending of the request to the host application from the first one of the drivers for one of the saved routes includes sending an indication that the first one of the drivers requests others of the saved routes that have fastest trip times and that have start and destination locations within predetermined distances of start and destination locations of the requested one of the saved routes;

and wherein the method includes:

receiving by the GPS device of the first one of the drivers others of the saved routes that have the fastest trip times and that have start and destination locations within predetermined distances of start and destination locations of the requested one of the saved routes.

16. The apparatus of claim 13, wherein the sending of the request to the host application from the first one of the drivers for one of the saved routes includes sending an indication that the first one of the drivers requests others of the saved routes that have fastest average trip times and that have start and destination locations within predetermined distances of start and destination locations of the requested one of the saved routes;

and wherein the method includes:

receiving by the GPS device of the first one of the drivers others of the saved routes that have the fastest average trip times and that have start and destination locations within predetermined distances of start and destination locations of the requested one of the saved routes.

17. The apparatus of claim 13, wherein the sending of the request to the host application from the first one of the drivers for one of the saved routes includes sending an indicated range of time of day and an indication that the first one of the drivers requests others of the saved routes that have start and destination locations within predetermined distances of start and destination locations of the requested one of the saved routes and that were during the indicated range of time of day;

and wherein the method includes receiving by GPS device of the first one of the drivers saved routes that have start and destination locations within predetermined distances of start and destination locations of the requested one of the saved routes and that were during the indicated range of time of day.

* * * * *